United States Patent

[11] 3,600,895

| [72] | Inventor | Xaver Suter Ruschlikon, Switzerland |
| --- | --- | --- |
| [21] | Appl. No. | 874,844 |
| [22] | Filed | Nov. 7, 1969 |
| [45] | Patented | Aug. 24, 1971 |
| [73] | Assignee | Werkzeugmaschinenfabrik Oerlikon-Buhrle AG Zurich, Switzerland |
| [32] | Priority | Nov. 11, 1968 |
| [33] | | Switzerland |
| [31] | | 16795/68 |

[54] MEANS FOR LOCATING A CYLINDRICAL PART IN AN AXIAL POSITION IN A HOLLOW CYLINDRICAL PART, MORE ESPECIALLY FOR A PROPELLANT CHARGE BODY AND A JET NOZZLE
3 Claims, 6 Drawing Figs.

| [52] | U.S. Cl. | 60/255, 285/321 |
| --- | --- | --- |
| [51] | Int. Cl. | F02k 9/04 |
| [50] | Field of Search | 60/255; 285/321 |

[56] References Cited
UNITED STATES PATENTS

| 2,748,702 | 6/1956 | Sawyer | 60/255 |
| --- | --- | --- | --- |
| 2,876,620 | 3/1959 | Weinland | 60/255 |
| 3,381,983 | 5/1968 | Hanes | 285/321 |

FOREIGN PATENTS

| 1,174,371 | 3/1959 | France | 285/321 |
| --- | --- | --- | --- |
| 1,249,028 | 8/1967 | Germany | 285/321 |

Primary Examiner—Mark M. Newman
Assistant Examiner—Warren E. Olsey
Attorney—Wenderoth, Lind & Ponack ABSTRACT: Means for locating a cylindrical part in an axial position in a hollow cylindrical part such as a propellant charge body and a jet nozzle body. A split spring washer grips in a circular groove in the cylindrical part, and in a circular groove in the hollow cylindrical part. A conical groove wall is provided on one of the two circular grooves. The connection of the two parts can be released in one direction, and can be loaded and locked in the other direction. For releasing the connection of both parts in the direction of loading and locking the cylindrical part is arranged in the hollow cylindrical part with radial play so that a relative tilting of both parts is impossible, and the spring washer upon gliding along on the conical groove wall is deformed and in the direction of loading and locking projects over the circular groove which contains the conical groove wall.

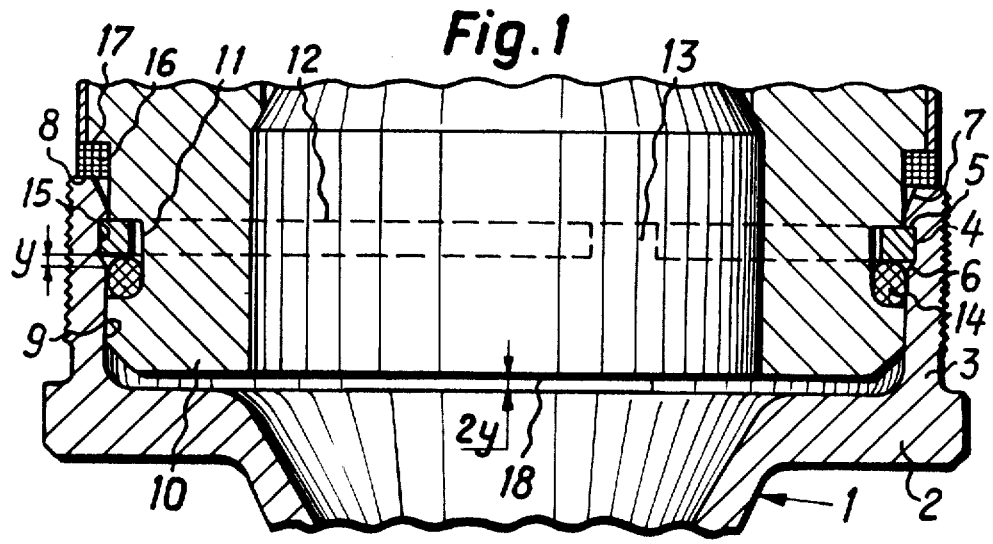
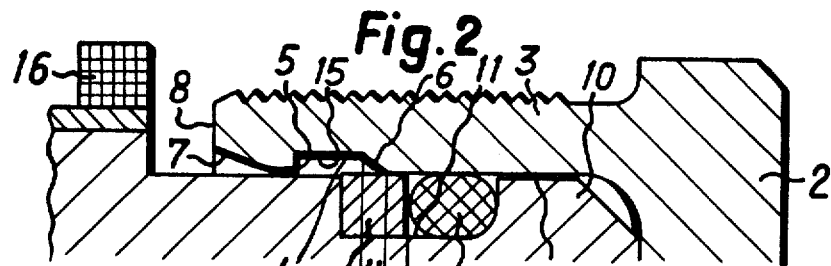
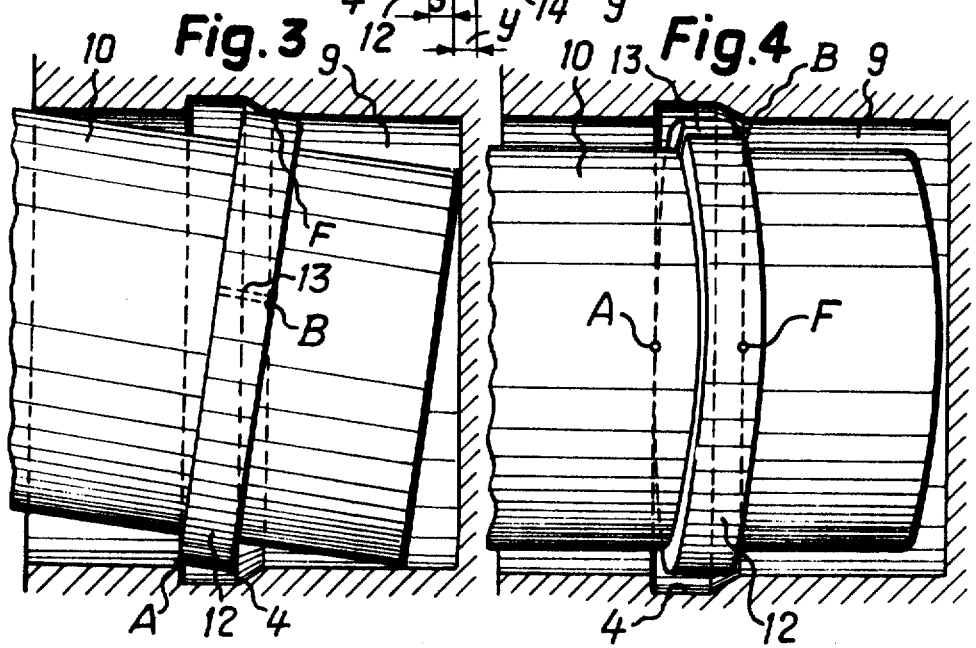

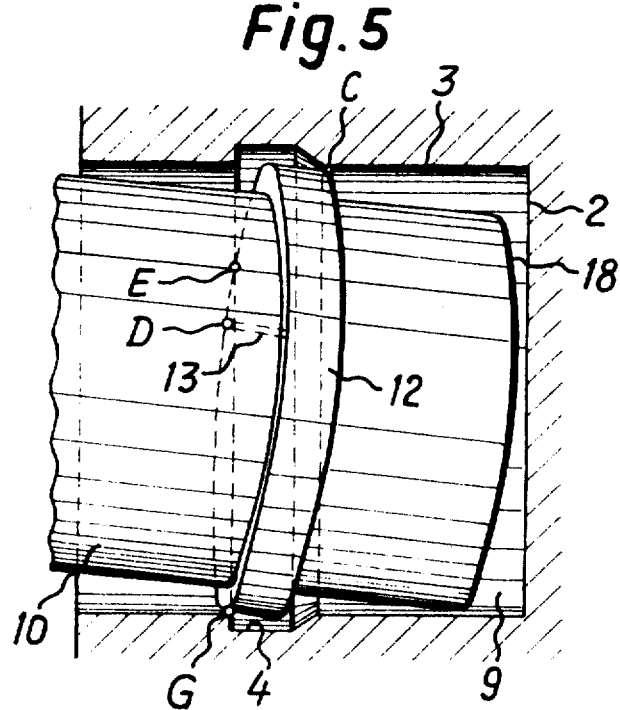
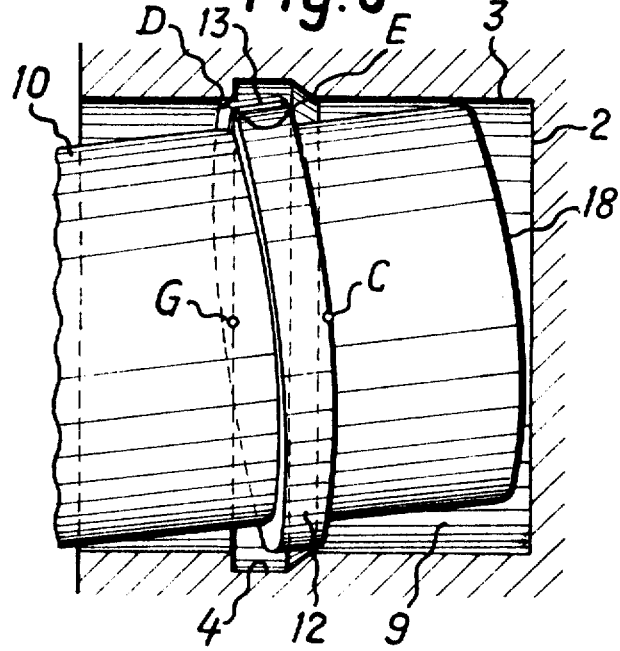

MEANS FOR LOCATING A CYLINDRICAL PART IN AN AXIAL POSITION IN A HOLLOW CYLINDRICAL PART, MORE ESPECIALLY FOR A PROPELLANT CHARGE BODY AND A JET NOZZLE

The invention relates to a means for locating a cylindrical part in an axial position in a hollow cylindrical part, more especially for a propellant charge body and a jet nozzle, having a split spring washer which grips in an external circular groove in the cylindrical part, and in an internal circular groove in the hollow cylindrical part, and having a conical groove wall on one of the two circular grooves, whereby the connection of the two parts can be released in one direction, and can be loaded and locked in the other direction.

In known axial position locating means of this form the bottom of the groove of one of the two circular grooves is of part conical shape. One split spring washer has a conical shape adapted to the shape of the bottom of the groove. In the direction of loading and locking the cylindrical part is held in the hollow cylindrical part by the spring washer. Upon moving both parts in the direction of releasing the spring washer can either be pressed into the circular groove on the cylindrical part, or be expanded into the circular groove on the hollow cylindrical part, so that both parts can be pulled away from one another. Releasing of the two parts by moving the same is not possible in the direction of loading and locking in the known case.

The aim of the present invention is to avoid this disadvantage of the known device. In accordance with the invention this is achieved in that for releasing the connection of both parts in the direction of charge, the cylindrical part is arranged in the hollow cylindrical part with radial play, so that a relative tilting of both parts is possible, and that the spring washer, upon gliding along on the conical groove wall, is deformed, and in the direction of loading and locking projects over the circular groove which contains the conical groove wall.

In accordance with a specially favored specific embodiment of the invention, the ratio of radial play of both parts to the length of the overlap of both parts is at least as great as the ratio of the axial length of the conical groove wall to the inner radius of the hollow cylindrical part.

In the drawing an exemplified embodiment of the subject matter of the invention is more fully described.

FIG. 1 shows a longitudinal section through the ends connected together of a jet nozzle and a propellant charge body, with a first possibility of releasing the connection;

FIG. 2 shows the first stage of the releasing procedure in a device according to FIG. 1;

FIG. 3 shows a second stage of the releasing procedure in ground plan, in a device according to FIG. 1;

FIG. 4 shows the stage of the releasing procedure represented in FIG. 3 in elevation;

FIG. 5 shows a third stage of the releasing procedure in ground plan, in a device according to FIG. 1;

FIG. 6 shows the stage of the releasing procedure represented in FIG. 5, in elevation.

With reference to FIG. 1, a jet nozzle 1 of a missile has a flange 2 and a cylindrical shoulder 3 surrounding a bore 9. The shoulder 3 contains a groove 4 which runs in a direction perpendicular to the longitudinal axis of the jet nozzle 1. A wall 6 of the groove 4 is formed as a part-conical surface. A further part-conical surface 7 inclined as the wall 6 is formed on an end surface 8 and the bore 9 of the shoulder 3. A cylindrical end portion 10 of a cylindrical propellant charge body projects into the bore 9 of the shoulder 3. In an annular groove 11 in the propellant charge body 10 are arranged beside one another a spring washer 12 split by a radial slit 13, and a flexible packing ring 14. The spring washer 12 grips in the groove 4. The width of the spring washer 12 is equal to the width of the bottom 15 of the groove 4. The packing ring 14, which is compressed between the bottom of the groove 11 of the propellant charge body 10 and the wall of the shoulder 3 and which is expanded in the direction of the longitudinal axis of the bore, holds the spring washer 12 against the wall 5 of the groove 4. By means of a rubber ring 16, clamped between a collar 17 of the propellant charge body 10 and the end surface 8 of the shoulder 3, the wall 5 of the groove 4 is held in contact with the spring washer 12. The end surface 18 of the propellant charge body 10, which is forced into the bore 9 is spaced apart from the flange 2 of the jet body 1, in the locked position. This spacing is at least twice as great as the axial length $y$ of the conical groove wall 6. The space between the collar 17 of the propellant charge body 10 and the end surface 8 is also at least $2y$. In the locked position the cylindrical propellant charge body 10 is forced within the jet body 1 to such a distance that the ratio of the radial play between bodies 10 and 3 to the length of overlap of the bodies is at least as great as the ratio of the axial length $y$ of the inclined wall 6 to the inner radius of the bore 9.

The locking means operates as follows.

The packing ring 14 and the washer 12, project radially from the groove 11 when the propellant charge body is separate from the jet nozzle. Upon introduction of the propellant charge body 10 into the bore 9 of the jet body 1, the ring and washer are forced together to bear against the conical surface 7 of the shoulder 3. The outer dimension of the ring and washer equals that of the bore when they reach the end of the surface 7. When the flexible ring 14 reaches the groove 4, it expands into the latter. As the propellant charge body is forced further into the bore 9 the diameter of ring 14 again becomes equal to that of the bore 9. The spring washer 12 which has been progressively compressed during passage down the surface 7 snaps open and enters the groove 4. The propellant charge body 10 is then locked to the jet body 1 and flexibly supported in the jet body 1 by the rubber ring 16 and the flexible packing ring 14 in both axial directions as in FIG. 1.

The releasing of the connection of the propellant charge body 10 and jet nozzle body 1, takes place as follows: With reference to FIG. 2, the rubber ring 16 is pulled away from the end surface 8 of the jet body 1 onto the portion of the body 10 of greater diameter. By pushing the body 10 against the jet nozzle body 1, the ends of the spring washer 12 are forced together by the reaction force transferred by the groove wall 4. When the rear end surface 18 of the body 10 pushes against the flange 2 of the jet nozzle body 1, the rear part of the open spring washer 12 abuts against the wall of that part of the bore 9 which lies behind the groove 4. As the end surface 18 of the body 10 has, in the locked position, a spacing of at least $2y$ from the flange 2 of the jet body 1, the spring washer abuts against the bore 9 over at least a distance $y$ when the bodies 10 and 1 are in contact.

The propellant charge body 10 is then tilted in the bore as sharply as possible about the point F, as is represented diagrammatically in FIG. 3. Thereby, its axis is moved into a plane which coincides with the plane of the drawing, subsequently called the tilting plane. After tilting, that point of the spring washer 12 which is indicated at A, and which is opposite the tilting point F, is supported on the wall of that part of the bore 9 which lies in front of the groove 4 towards the flange 2. As the slit 13 of the spring washer 12 lies between the axis of the washer and the tilting point F, and since, therefore, its rear end B, after tilting, is always in the region of the rear part of the bore 9, the spring washer cannot open during the tilting of the combustion chamber 10, and spring back into the groove 4.

FIG. 4 shows the same movement as FIG. 3, but in elevation.

With reference to FIG. 5 the propellant charge body 10 is then tilted so that that part of the propellant charge body 10 which is behind the pivotal axis C–G, is moved into the plane of the drawing, and that part of the body 10 which is in front of the pivotal axis C–G, is moved out of the plane of the drawing. Simultaneously, the body is pulled a little way away from the sides of the bore 9 so that the end surface 18 of the body 10 is separated from the flange 2 of the jet body 1. In this way, one part of the slit 13 of the spring washer 12 reaches that part of the bore 9 which lies in front of the groove 4 towards the flange 2. The spring washer 12 cannot expand upwards during this movement, as it is supported at the points C and G, and along one part of its periphery on the bore 9. As the spring washer is supported at the end of this movement phase from the front end D of the slit 13 upwards as far as the point E on the wall of the front part of the bore 9, that part of the spring washer 12 which lies over the slit 13 also cannot open and snap into the groove 4 when the body 10 is subsequently pulled forward out of the bore 9.

I claim:

1. Means for locating a cylindrical part in an axial position in a hollow cylindrical part particularly a propellant charge body in a jet nozzle, comprising a cylindrical part having an external circular groove, a hollow cylindrical part having an interior circular groove, a split spring washer for gripping in said external groove and in said interior groove, a conical groove wall on one of said two grooves whereby the connection means of said two parts can be released in one direction and can be loaded and locked in the other direction, said connection means for releasing the connection of both parts in the direction of loading and locking said cylindrical part being arranged in said hollow cylindrical part with radial play for a relative tilting of both said parts, the ratio of said radial play of said parts to the length of the overlap of both parts is at least as great as the ratio of the axial length of said conical groove wall to the inner radius of said hollow cylindrical part and said spring washer upon gliding along on said conical groove wall is deformed, and in the direction of loading and locking projects over said interior groove.

2. Means as set forth in claim 1 wherein said cylindrical part has a collar and said hollow cylindrical part is kept at a distance in the locked position at the front surface of said collar by means of a rubber ring.

3. Means as set forth in claim 1 wherein the width of said external groove is greater than the width of said spring washer and a flexible packing ring is located adjacent said spring washer in said external groove.